United States Patent
Chen et al.

(10) Patent No.: US 6,240,243 B1
(45) Date of Patent: May 29, 2001

(54) METHOD AND APPARATUS FOR STORING AND RETRIEVING SCALABLE VIDEO DATA IN A DISK-ARRAY-BASED VIDEO SERVER

(75) Inventors: Ming-Syan Chen, Yorktown Heights; Dilip Dinkar Kandlur, Briarcliff Manor; Philip Shi-lung Yu, Chappaqua, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/350,195

(22) Filed: Dec. 5, 1994

(51) Int. Cl.[7] .................................. H04N 5/85; H04N 5/90
(52) U.S. Cl. ............................................. 386/125; 725/92
(58) Field of Search .................................. 358/342; 348/7, 348/8, 10, 12, 13; 386/45, 36, 46, 105, 106, 122, 125, 126; 360/22, 23; 725/92, 94, 115, 87

(56) References Cited

U.S. PATENT DOCUMENTS

| | | | |
|---|---|---|---|
| 5,027,400 | * | 6/1991 | Baji et al. ............................... 380/20 |
| 5,414,455 | * | 5/1995 | Hooper et al. ............................ 348/7 |
| 5,450,139 | * | 9/1995 | Haraguchi et al. ................... 348/705 |
| 5,453,779 | * | 9/1995 | Dan et al. ................................ 348/7 |
| 5,461,415 | * | 10/1995 | Wolf et al. .............................. 348/7 |
| 5,510,905 | * | 4/1996 | Birk ..................................... 358/342 |
| 5,528,282 | * | 6/1996 | Voeten et al. ............................ 348/7 |

OTHER PUBLICATIONS

"Scalable Storage Servers For Digital Audio and Video", P Lougher et al., IEE Conference on Storage and Recording Systems, Apr. 5–7, 1994, pp. 14–143, Publication No. 402.*

"Designing a Multiuser HDTV Storage Server", Harrick M. Vin et al., IEEE Journal On Selected Areqas In Communications, vol. 11. No. 1. Jan. 1993, pp. 153–164.*

* cited by examiner

Primary Examiner—Wendy R. Garber
Assistant Examiner—Aung S. Moe
(74) Attorney, Agent, or Firm—Kevin M. Jordan

(57) ABSTRACT

The rate staggering technique for efficient storage and retrieval of video data is embodied in a data processing system including a disk array based video server, which includes a disk array for storing video data, a processor for processing data, a memory buffer for storing video data and a rate staggering controller. Data is transferred to a network from video server through a network interface and from the network to client stations employing devices having differing resolution capabilities. The processor executes tasks under control of the rate staggering controller. These tasks include a retrieval task which retrieves scalable video from the array of disks, a storage task which stores videos temporarily in the memory buffer, and a transmission task which transmits video to client stations through the network.

7 Claims, 3 Drawing Sheets

METHOD AND APPARATUS FOR STORING AND RETRIEVING SCALABLE VIDEO DATA IN A DISK-ARRAY-BASED VIDEO SERVER

BACKGROUND OF THE INVENTION

1. Field of the Invention

The present invention relates to data processing systems and more particularly to data processing systems including display of data and to the storage and retrieval of scalable video data in a disk array-based video server.

2. Prior Art

Recently, the promise of multimedia technologies to have a significant impact on both information providing service and entertainment business has created several new ventures. Given the extremely large data size, the major challenge to handling multimedia data is to support not only very high disk bandwidth for video retrieval but also very high network bandwidth for data transmission. ATM (Asynchronous Transfer Mode) has been proposed as a solution to meet the demand for high network bandwidth. On the other hand, disk-arrays are employed to provide the disk bandwidth required for a video server. For example, an HDTV (high definition television) quality image, will require video data at 2 Mbytes per second (even after compression). It is not desirable to store such video in a single disk for two reasons. First, a 100 minute HDTV movie will require 12 Gbyte of storage. Such a large disk is usually expensive. Second, playing a hot (i.e., frequently requested) movie by a single disk may cause a performance bottleneck. In fact, even for playing movies of ordinary quality, the need to support multiple video streams from a video server also calls for the use of disk-arrays. Consequently, it is highly desirable to use data striping in a disk-array to handle the storage and retrieval of video data, where data striping means dividing the video data into blocks according to their presentation order (i.e., time sequence) and storing these blocks on different disks. It is noted that with such a data striping method, better load balancing can be achieved by staggering the starting times of different video streams. This is called time staggering.

Although data striping improves system performance, a large buffer is required to store the data and loading between disks in the array can become unbalanced.

In order to serve users with different requirements and capabilities from a single copy of a video, it is necessary to develop a scalable video stream. Multi-resolution coding is able to provide scalable video.

SUMMARY OF THE INVENTION

It is an object of the present invention to store and retrieve scalable video data in a disk-array-based video server so as to minimize the buffer space required by the server and to improve the system throughput.

Accordingly, a proposed rate staggering technique is as follows: Let r be the number of different classes of video the server can provide; the whole video data is divided into r partitions, called rate 1 data, rate 2 data, . . . , and rate r data; the lowest quality video, referred to as class 1 video, requires only rate 1 data for playout; the second to the lowest quality video, referred to as class 2 video, requires both rate 1 and rate 2 data for playout; in general, class i video requires all rate j data, $1 \leq j \leq i$, for playout; let P (in byte/second) be the playout speed for the decoder to play out the full resolution video and T be the one round retrieval time by the disk array; using the double buffering method (i.e., the buffer space is chosen to be twice as that needed to accommodate the data retrieved in one round), the buffer space required by the server for a full resolution stream is equal to 2T P.

Let b (in bytes) be the size of each block and k be the displacement factor for staggering data blocks of different rates in the disk array. For example, the displacement factor in Table 2 is two.

$$\left\lceil \frac{TP}{b} \right\rceil$$

is the number of data blocks needed by a full resolution video stream within the time duration T, where $\rceil . \lceil$ is a ceiling function. Hence, in order to achieve load balancing among disks, the displacement factor k is designed to be $$\left\lceil \frac{TP}{br} \right\rceil.$$

Such a placement by rate staggering can spread the workload of each stream evenly across disks.

Denote the buffer size of the end decoder as $B_D$. It is noted that the maximal amount of data the end decoder can retrieve at a time is half of its total buffer size (i.e., the other half is being used for playout). $B_D$ thus has to be greater than or equal to $$2 \left\lceil \frac{TP}{b} \right\rceil b.$$

The data placement for scalable video in a disk array of n disks can be determined by Procedure R below.

Procedure R: Data placement for scalable video in a disk array of n disks.

Step 1: Determine the displacement factor $$k = \left\lceil \frac{TP}{br} \right\rceil.$$

Step 2: Place block $B_{i,j}$ in disk d(i, j), where d(i, j)=[(j−1)k+i]$_n$ $[b]_a$ means b mod a. $B_{i,j}$ is a block comprising rate j data of the ith clip. It can be seen from Table 2 that with n=8 and k=2, $B_{3,2}$ resides in disk d(3, 2)=[2+3]$_8$=5 and $B_{5,4}$ resides in disk d(5, 4)=[6+5]$_8$=3.

The rate staggering technique for efficient storage of video data is embodied in a data processing system including a disk array based video server, which includes a disk array for storing video data, a processor for processing data, a memory buffer for storing video data and a rate staggering controller. Data is transferred to a network from video server through a network interface and from the network to client stations employing devices having differing resolution capabilities. The processor executes tasks under control of the rate staggering controller. These tasks include a retrieval task which retrieves scalable video from the array of disks, a storage task which stores videos temporarily in the memory buffer, and a transmission task which transmits video to client stations through the network.

These, and other objects, features and advantages of this invention will become apparent from the following detailed description of the invention taken in conjunction with the accompanying drawings.

BRIEF DESCRIPTION OF THE DRAWING

For a more complete understanding of the present invention, and the advantages thereof, reference is now

DETAILED DESCRIPTION OF A PREFERRED EMBODIMENT OF THE INVENTION

Multi-resolution coding, referring to the encoding technique which accommodates at least two resolutions in a video stream, is able to provide scalable video. Scalable video means a video which is coded in such a way that subsets of the full video bit stream can be decoded to create videos of different resolutions. Supporting layered multiple resolutions from a video server is desirable by the broadcasting industry since a video provider (such as a Video On Demand ("VOD") company) may want to provide different customers with different levels of service. Naturally, the resolution of a video ordered by a customer with an HDTV will be higher than that ordered by a customer with a standard TV. In addition, multiple resolution encoding is useful for the computer industry for such applications as multiplatform decoding which allows video to be decoded by platforms of different capabilities, and also multiwindow decoding where videos of different resolutions can be independently selected by decoders to produce videos for different window sizes.

Figure 1:
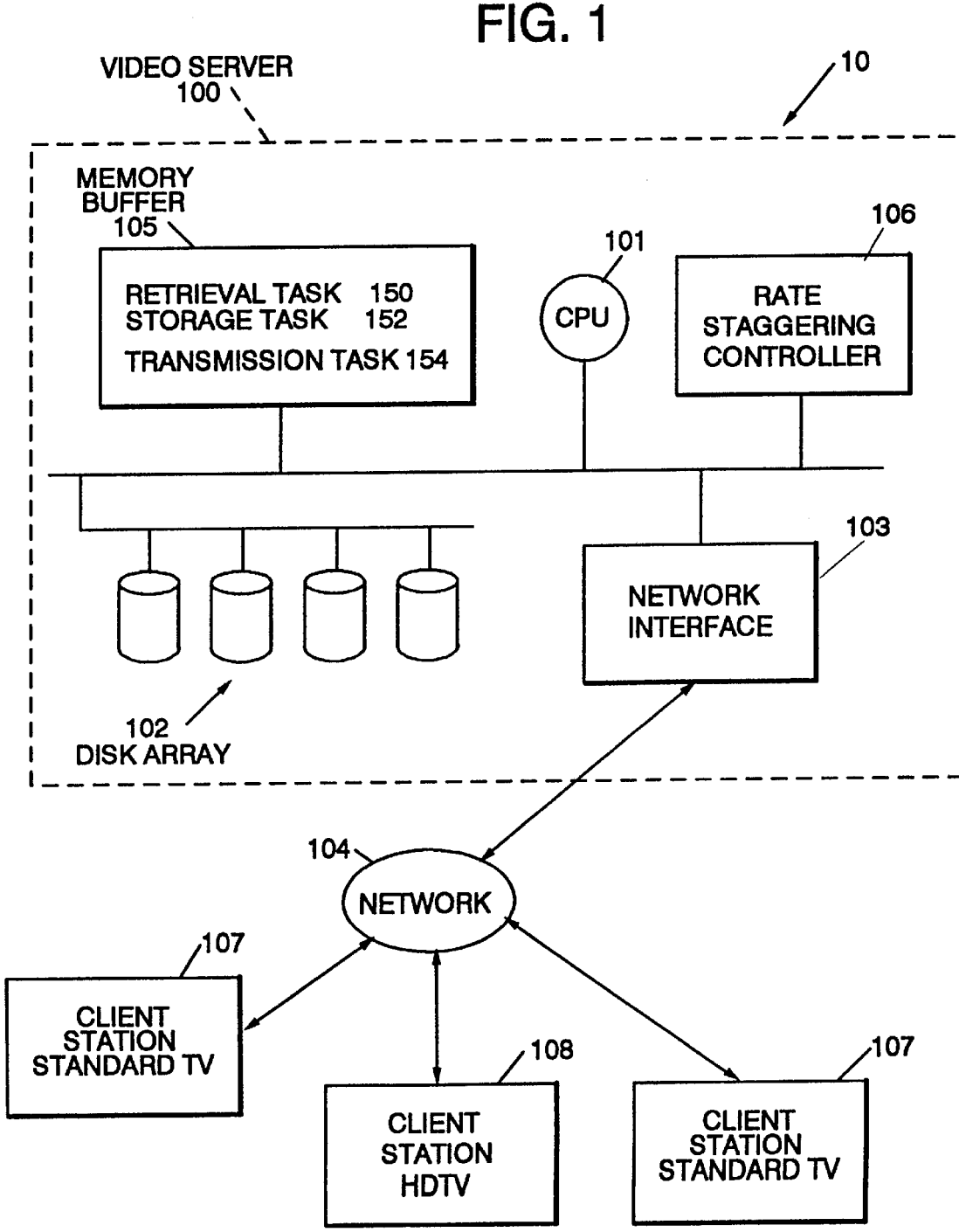
FIG. 1 is a block diagram of a system including a disk-array-based video server to provide multiresolution videos embodying the present invention.

Research on multi-resolution coding has led to the development of hierarchical coding techniques such as subband coding. Basically, subband coding is an approach of using a filter bank to decompose the original video into several frequency bands, resulting in a set of multiple resolution videos. For example, by dividing the frequency domain into four regions, one can decompose the original video into four sets, say R1, R2, R3 and R4, where Ri is called rate i data. Then, R1 corresponds to the basic video (class 1), R1+R2 corresponds to class 2 video, R1+R2+R3 corresponds to class 3 video, and R1+R2+R3+R4 corresponds to the full resolution video. FIG. 1 shows a disk-array-based video server 100, embodying the present invention, which provides multi-resolution video.

Note that video data of different rates can be separately stored to provide videos of different resolutions. It is not required to store those data corresponding to different rates of the same video clip within the same disk. Consequently, by staggering the storage of video blocks in the disk-array according to data rates, the present invention provides rate staggering method and apparatus to store and retrieve scalable video data in a disk-array-based video server so as to minimize the buffer space required by the server and to improve the system throughput.

Referring now to FIG. 1, a system 10 including a disk-array-based video server 100 will be described. Video server 100 includes a disk array 102 for storing video data. The video data is transmitted to the end client stations 107, 108 over network 104 upon request. The client stations 107, 108 may be equipped with standard TV (107), or with HDTV (108), requiring videos of different resolutions. The videos are stored on the disks (102). The video server (100) includes a processor (CPU) (101) which executes tasks under control of a rate staggering controller (106). These tasks include a retrieval task (150) which retrieves scalable videos from the disks (102), a storage task (152) which stores videos temporarily in the memory buffer (105) and a transmission task (154) which transmits videos to client stations by way of a communication network (104) via a network interface (103).

The video server (100) can be embodied using any processor of sufficient performance for the number of video streams to be supported. For example, a small capacity video server could be embodied using a RISC System/6000 (TM) system while a larger capacity server could be embodied using an ES/9000 (TM) system (both available from International Business Machines Corporation of Armonk, N.Y.). The disk array 102 can be of the RAID level 1 type. The communication network 104 can be, for example a fiber optical network or a conventional cable network.

Figure 2:
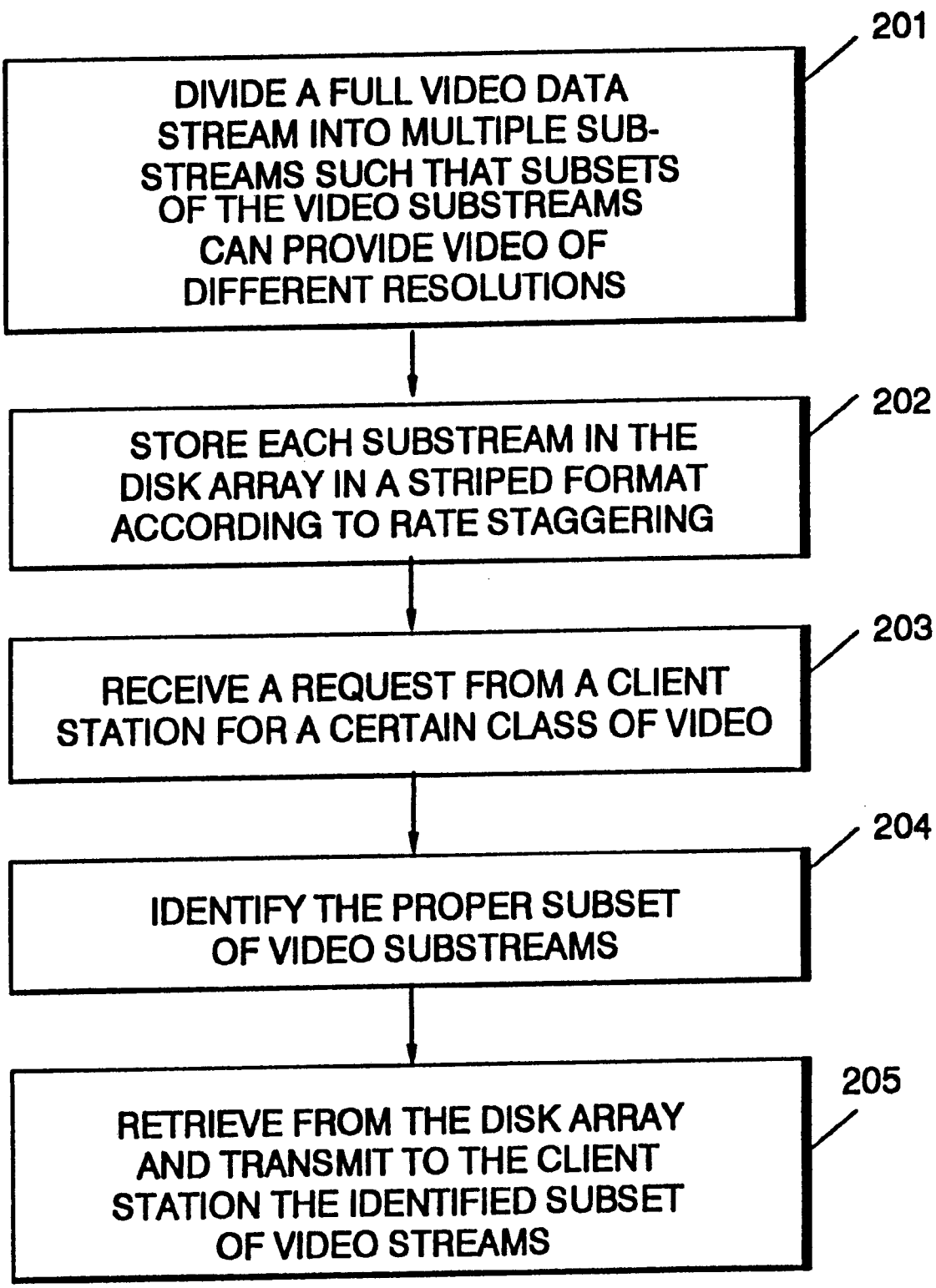
FIG. 2 shows a flowchart for the video server of FIG. 1 to provide scalable videos.

FIG. 2 is the flowchart for the video server (100) in FIG. 1 to provide scalable videos. In the first step (201), a full video bit stream is divided into multiple substreams in such a way that subsets of the video substreams can be decoded to create videos of different resolutions. In the second step (202)., each of those substreams is stored in a disk array in a striped format according to the rate staggering method provided by Procedure R above. In the third step (203), the video server receives a request from a client station for a certain class of video. In the fourth step (204), the video server identifies, according to the resolution class of video requested, the proper subset of video substreams. In the fifth step (205), the video server retrieves from the disk-array and transmits to the viewer the identified subset of video streams so as to minimize the corresponding buffer space required by the server.

The storage unit of video data is a block, which is composed of a sequence of frames. An example for the conventional scalable video placement, which has data striping but not rate staggering, is shown in Table 1, where a disk array of 8 disks is used and the block comprising rate j data of the i'th clip is denoted by $B_{i,j}$. An example for the scalable video placement with rate staggering is given in Table 2. As it becomes clear later, the proposed approach of rate staggering has the following three advantages: (1) the intermediate buffer space required by the server is minimized, (2) better load balancing is achieved due to finer scheduling granularity and (3) the disk bandwidth fragmentation is alleviated due to better bandwidth allocation.

To demonstrate the advantages of rate staggering, consider first the video data placement without rate staggering in Table 1 below. Let the time required for one disk to retrieve one data block of size b be $T_1$, and the local buffer size of client station 107, 108 be 16b. With the double buffering method, the client station 107, 108 with a local buffer size 16b, requires to play 8 data blocks in $T_1$. amount of time in order to play the full resolution video. For the data placement in Table 1, one has to retrieve all 32 blocks in one round of retrieval (with the duration $4T_1$), which would require the available buffer size of 2 * 32b=64b at the server. Note that the server can only send 8b data to the client station 107, 108 at a time due to the limited buffer size of the client station (i.e., 16b). Given the placement in Table 1, the server 100 has to retrieve all 32 blocks (4 blocks from each disk) in order to extract 8 blocks to send to the client station 107, 108 for playout.

TABLE 1

| | Disk No. | | | | | | | |
|---|---|---|---|---|---|---|---|---|
| | 1 | 2 | 3 | 4 | 5 | 6 | 7 | 8 |
| Rate 1 | $B_{1,1}$ | $B_{2,1}$ | $B_{3,1}$ | $B_{4,1}$ | $B_{5,1}$ | $B_{6,1}$ | $B_{7,1}$ | $B_{8,1}$ |
| Rate 2 | $B_{1,2}$ | $B_{2,2}$ | $B_{3,2}$ | $B_{4,2}$ | $B_{5,2}$ | $B_{6,2}$ | $B_{7,2}$ | $B_{8,2}$ |
| Rate 3 | $B_{1,3}$ | $B_{2,3}$ | $B_{3,3}$ | $B_{4,3}$ | $B_{5,3}$ | $B_{6,3}$ | $B_{7,3}$ | $B_{8,3}$ |
| Rate 4 | $B_{1,4}$ | $B_{2,4}$ | $B_{3,4}$ | $B_{4,4}$ | $B_{5,4}$ | $B_{6,4}$ | $B_{7,4}$ | $B_{8,4}$ |

TABLE 2

| | Disk No. | | | | | | | |
|---|---|---|---|---|---|---|---|---|
| | 1 | 2 | 3 | 4 | 5 | 6 | 7 | 8 |
| Rate 1 | $B_{1,1}$ | $B_{2,1}$ | $B_{3,1}$ | $B_{4,1}$ | $B_{5,1}$ | $B_{6,1}$ | $B_{7,1}$ | $B_{8,1}$ |
| Rate 2 | $B_{7,2}$ | $B_{8,2}$ | $B_{1,2}$ | $B_{2,2}$ | $B_{3,2}$ | $B_{4,2}$ | $B_{5,2}$ | $B_{6,2}$ |
| Rate 3 | $B_{5,3}$ | $B_{6,3}$ | $B_{7,3}$ | $B_{8,3}$ | $B_{1,3}$ | $B_{2,3}$ | $B_{3,3}$ | $B_{4,3}$ |
| Rate 4 | $B_{3,4}$ | $B_{4,4}$ | $B_{5,4}$ | $B_{6,4}$ | $B_{7,4}$ | $B_{8,4}$ | $B_{1,4}$ | $B_{2,4}$ |

Figure 3A:
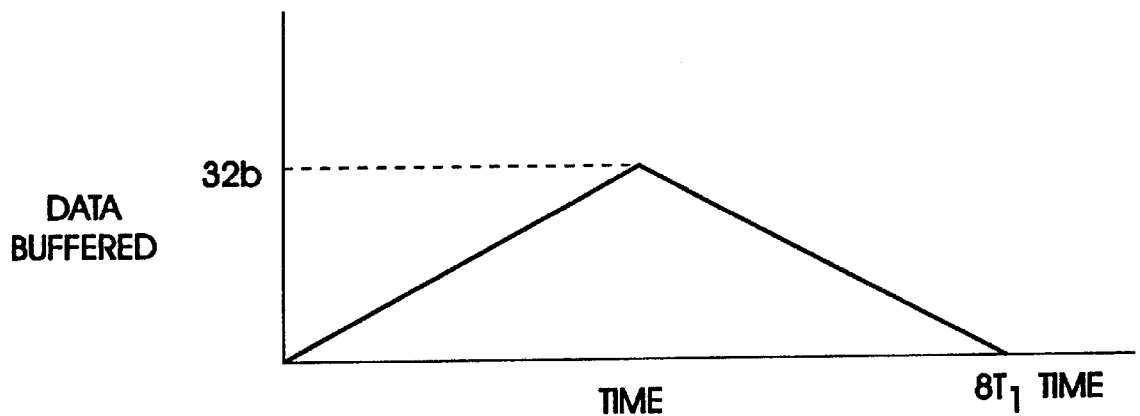
FIG. 3a is an illustration of the amount of data buffered in a prior art system without rate staggering.
Figure 3B:
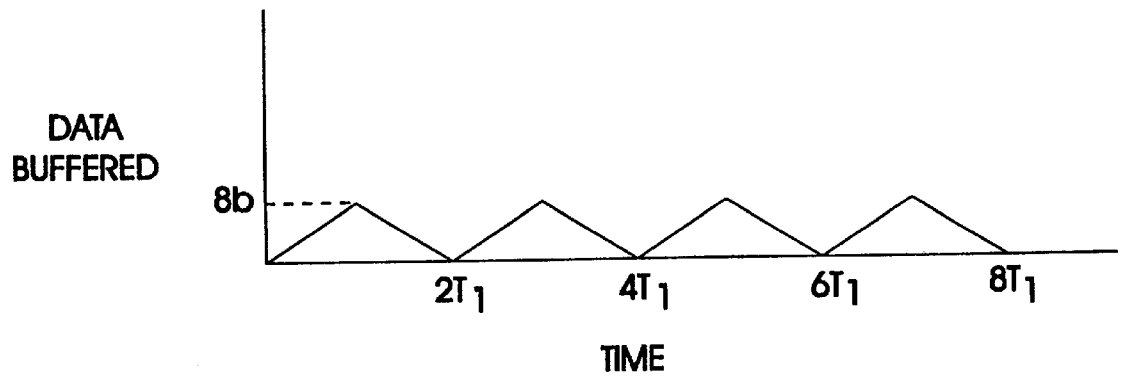
FIG. 3b is an illustration of the amount of data buffered in a system embodying the present invention with rate staggering.

In contrast, given the data placement with rate staggering in Table 2, one only has to retrieve 8 blocks in one round of retrieval (with the duration $T_1$), as shown in Table 3, which requires the buffer size of 2 * 8b=16b at the server 100, only a quarter of that required by the case without rate staggering. Illustration for the amount of data buffered in half of the buffer space is shown in FIG. 3. It is noted that the above request from a client station 107, 108 cannot be satisfied by a server 100 with an available buffer space within the range[16b, 64b), unless the technique of rate staggering is employed. It is noted that this advantage of using rate staggering holds when multiple streams are considered.

TABLE 3

| | Disk No. | | | | | | | |
|---|---|---|---|---|---|---|---|---|
| | 1 | 2 | 3 | 4 | 5 | 6 | 7 | 8 |
| Round 1 | $B_{1,1}$ | $B_{2,1}$ | $B_{1,2}$ | $B_{2,2}$ | $B_{1,3}$ | $B_{2,3}$ | $B_{1,4}$ | $B_{2,4}$ |
| Round 2 | $B_{3,4}$ | $B_{4,4}$ | $B_{3,1}$ | $B_{4,1}$ | $B_{3,2}$ | $B_{4,2}$ | $B_{3,3}$ | $B_{4,3}$ |
| Round 3 | $B_{5,3}$ | $B_{6,3}$ | $B_{5,4}$ | $B_{6,4}$ | $B_{5,1}$ | $B_{6,1}$ | $B_{5,2}$ | $B_{6,2}$ |
| Round 4 | $B_{7,2}$ | $B_{8,2}$ | $B_{7,3}$ | $B_{8,3}$ | $B_{7,4}$ | $B_{8,4}$ | $B_{7,1}$ | $B_{8,1}$ |

TABLE 4

| | Disk No. | | | | | | | |
|---|---|---|---|---|---|---|---|---|
| | 1 | 2 | 3 | 4 | 5 | 6 | 7 | 8 |
| Round 1 | $B_{1,1}$ | $B_{2,1}$ | $B_{1,2}$ | $B_{2,2}$ | — | — | — | — |
| Round 2 | — | — | $B_{3,1}$ | $B_{4,1}$ | $B_{3,2}$ | $B_{4,2}$ | — | — |
| Round 3 | — | — | — | — | $B_{5,1}$ | $B_{6,1}$ | $B_{5,2}$ | $B_{6,2}$ |
| Round 4 | $B_{7,2}$ | $B_{8,2}$ | — | — | — | — | $B_{7,1}$ | $B_{8,1}$ |

Table 4 shows an example for data retrieval for class 2 scalable video using the rate staggering method. In Table 4, because of rate staggering, the workload incurred by stream B is spread across 4 disks. Moreover, in a multiuser environment better load balancing can be achieved by properly delaying the start of a newly requested video so as to avoid bandwidth fragmentation. Table 5 shows a scenario of delaying the starting time of stream C from Round 1 to Round 2 to avoid bandwidth fragmentation. The finer storage granularity provided by rate staggering leads to more benefit from this time staggering method. A video server 100 using the rate staggering method can provide feasible solutions to some stream requests which cannot be otherwise satisfied, thus increasing the system throughput.

TABLE 5

| | Disk No. | | | | | | | |
|---|---|---|---|---|---|---|---|---|
| | 1 | 2 | 3 | 4 | 5 | 6 | 7 | 8 |
| Round 1 | $B_{1,1}$ | $B_{2,1}$ | $B_{1,2}$ | $B_{2,2}$ | — | — | — | — |
| Round 2 | $C_{1,1}$ | $C_{2,1}$ | $B_{3,1}$ | $B_{4,1}$ | $B_{3,2}$ | $B_{4,2}$ | — | — |
| Round 3 | — | — | $C_{3,1}$ | $C_{4,1}$ | $B_{5,1}$ | $B_{6,1}$ | $B_{5,2}$ | $B_{6,2}$ |
| Round 4 | $B_{7,2}$ | $B_{8,2}$ | — | — | $C_{5,1}$ | $C_{6,1}$ | $B_{7,1}$ | $B_{8,1}$ |

Although the present invention and its advantages have been described in detail, it should be understood that various changes, substitutions and alterations can be made herein without departing from the spirit and scope of the invention as defined by the appended claims.

What is claimed is:

1. A method of storing video data having a plurality of resolution classes in a disk-array-based video server, comprising the steps of:

dividing a video bit stream into a plurality of substreams such that subsets of said substreams can be decoded to create a plurality of output videos of different resolution classes;

storing each of said substreams in a disk array comprising a plurality of disk storage devices in a striped format, wherein blocks for each resolution are stored in a staggered pattern across said disk storage devices in said array;

receiving, by the said video server, a request from a client for a certain class of video;

identifying, according to a resolution class of video requested, a subset of video substreams;

retrieving from said disk-array and transmitting to said client said identified subset of video streams so as to minimize buffer space required by said server for storage of video data; and wherein rate staggering is employed to store data corresponding to different data rates of a video clip into different disks in said disk array.

2. The method of claim 1, wherein rate staggering includes the step of storing block $B_{i,j}$ in disk $d(i,j)$ wherein $d(i,j)=[(j-1)k+i]_n$ and wherein $B_{i,j}$ is a block comprising rate j data of the ith video clip, k is a displacement factor, and n is the number of disks in said array.

3. A method of retrieving scalable video streams stored in a disk array, employing data striping and data rate staggering comprising the steps of:

receiving, by a video server, the request from a client for a video stream of a predetermined class;

identifying, according to said class of video stream requested, a subset of video substreams;

determining, according to a current retrieval pattern of existing streams, a starting time of a next stream to provide said identified subset of video streams to minimize disk data bandwidth requirement; and wherein said rate staggering is employed to store said data corresponding to different data rates of a video clip into different disks in said disk array.

4. A system for delivering video signals to a requestor, comprising:

one or more requestor stations;

a network connecting said requestor stations for transmitting data to and from said requestor stations;

a video server connected to said network for receiving requests from said requestor stations and for delivering video data to one or more of said requestor stations, said video server comprising:

a processor for controlling the operation of said video server;

an array of disk storage devices for storing data to be transmitted to said requestor stations, said array comprising a plurality of independent disk storage devices;

a buffer storage device for temporary storage of data to be retrieved from said array and transmitted to one or more of said requestors;

a network interface for managing data communication between said network and said video server; and a rate staggering controller for controlling the storage and retrieval of data to and from said array of disk storage devices to optimize system bandwidth and buffer storage utilization; and wherein said rate staggering controller further comprises means for storing data in said array in a rate staggered technique in which data corresponding to different data rates of a video clip are stored into different disks in said disk array.

5. A system according to claim 4 wherein said rate staggering controller further comprises means for storing data in said disk array in a striped format.

6. A system according to claim 4 wherein each of said requester stations requests data from said video server at one of a plurality of data resolutions.

7. The system, according to claim 4, wherein said rate staggered technique includes storing block $B_{i,j}$ in disk $d(i,j)$ wherein $d(i,j)=[(j-1)\ k+i]_n$ and wherein $B_{i,j}$ is a block comprising rate j data of the ith video clip, k is a displacement factor, and n is the number of disks in said array.

* * * * *